US012358031B1

(12) United States Patent
Sang

(10) Patent No.: US 12,358,031 B1
(45) Date of Patent: Jul. 15, 2025

(54) SPLIT ULTRASONIC CLEANING MACHINE

(71) Applicant: Shaohua Sang, Xianning (CN)

(72) Inventor: Shaohua Sang, Xianning (CN)

( * ) Notice: Subject to any disclaimer, the term of this patent is extended or adjusted under 35 U.S.C. 154(b) by 0 days.

(21) Appl. No.: 18/989,073

(22) Filed: Dec. 20, 2024

(30) Foreign Application Priority Data

Dec. 5, 2024 (CN) ......................... 202423005183.4

(51) Int. Cl.
*B08B 3/12* (2006.01)
*B08B 3/14* (2006.01)
*B08B 13/00* (2006.01)

(52) U.S. Cl.
CPC .................. *B08B 3/12* (2013.01); *B08B 3/14* (2013.01); *B08B 13/00* (2013.01)

(58) Field of Classification Search
CPC .............. B08B 3/12; B08B 3/14; B08B 13/00
USPC .......................................................... 134/107
See application file for complete search history.

(56) References Cited

U.S. PATENT DOCUMENTS 9,364,870 B2 6/2016 Spyropoulos et al.
2022/0031877 A1 2/2022 Liao

FOREIGN PATENT DOCUMENTS

CN 210304859 U 4/2020
CN 215430583 U 1/2022
CN 217251157 U 8/2022

*Primary Examiner* — Tinsae B Ayalew

(57) ABSTRACT

A split ultrasonic cleaning machine, which includes: a base, provided with a mounting groove and a main control module; a cylinder body, detachably mounted in the mounting groove, wherein the cylinder body is provided with a cleaning groove, and a bottom of the cylinder body is provided with an ultrasonic cleaning module electrically connected to the main control module; and a cover body, covering a notch of the mounting groove. According to the technical solution, the cylinder body is detachably arranged in the mounting groove, and the modular design of the integral assembly of the device is achieved, so that when the split ultrasonic cleaning machine needs cleaning or maintenance, the cylinder body can be quickly disassembled from the mounting groove, the cleaning liquid is prevented from entering the base to damage the main control module.

15 Claims, 6 Drawing Sheets

SPLIT ULTRASONIC CLEANING MACHINE

CROSS-REFERENCE TO RELATED APPLICATIONS

The application claims priority of Chinese patent application CN2024230051834, filed on Dec. 5, 2024, which is incorporated herein by reference in its entireties.

TECHNICAL FIELD

The present invention relates to the field of household appliances, and in particular, to a split ultrasonic cleaning machine.

BACKGROUND

Split ultrasonic cleaning machines, as a highly efficient cleaning device, are widely used in household, medical, industrial and other fields, and mainly use high-frequency impact force generated by ultrasonic vibration to achieve deep cleaning of the items to be cleaned. However, existing split ultrasonic cleaning machines generally have a design in which an inner container cannot be disassembled. This structural design limits the ease of use and durability of the cleaning machines to a certain extent.

Specifically, a user needs to clean the inner container of the cleaning machine regularly during daily use. However, since the inner container is fixedly connected to a machine body and cannot be disassembled, when the user cleans the inner container, it is difficult to prevent cleaning liquid, sewage or other residual liquid from entering the inside of the cleaning machine body. When the cleaning liquid penetrates into the machine body, which may cause corrosion or short circuit of electrical components, thus causing device failure. Especially in the case of long-term use, the liquid accumulates inside the machine body, which not only causes irreversible damage to electronic modules of the device, but may also cause safety hazards such as short circuit or leakage.

In addition, the disassembly of the inner container also increases the difficulty for the user to clean the device. During daily cleaning, the user is unable to thoroughly clean a bottom and corners of the inner container. These areas are prone to accumulation of dirt, cleaning liquid residues, and microbial growth, which leads to secondary pollution, affects the cleaning effect, and reduces the user experience.

SUMMARY

A primary objective of the present invention is to provide a split ultrasonic cleaning machine, which aims to improve the practicability of the conventional split ultrasonic cleaning machine.

To achieve the objective, the split ultrasonic cleaning machine provided by the present invention includes:

- a base, wherein the base is provided with a main control module; and
- a cylinder body, wherein the cylinder body is detachably mounted on the base, a cleaning groove is provided in the cylinder body, an ultrasonic cleaning module is provided at a bottom of the cylinder body, and the ultrasonic cleaning module is electrically connected to the main control module.

Optionally, the base includes an upper shell and a lower shell buckled with the upper shell, the upper shell and the lower shell are enclosed to form a first mounting cavity, and the main control module is provided in the first mounting cavity.

Optionally, the main control module is provided with a power supply terminal, the ultrasonic cleaning module is provided with an electric terminal, the upper shell is provided with a first mounting hole, and the power supply terminal passes through the first mounting hole and is electrically connected to the electric terminal.

Optionally, the cylinder body includes an outer container body and an inner container body, the outer container body has a second mounting cavity with an opening at one side, the inner container body is provided in the second mounting cavity and closes the opening of the second mounting cavity, the cleaning groove is formed at a top of the inner container body, and the ultrasonic cleaning module is provided in the second mounting cavity; and a second mounting hole is formed in a bottom of the outer container body, and the electric terminal passes through the second mounting hole and is electrically connected to the power supply terminal.

Optionally, the ultrasonic cleaning module includes an electric terminal and a piezoelectric ceramic disk electrically connected to the electric terminal, and the piezoelectric ceramic disk is provided at a bottom of the inner container body.

Optionally, the outer container body includes a first shell and a second shell buckled with the first shell, a fixed frame is provided in the second shell, a lap joint is provided by protruding outwards from the top of the inner container body, the lap joint is lapped on a top of the fixed frame, and the first shell extrudes the lap joint.

Optionally, the cylinder body further includes a sealing ring, and the sealing ring is sleeved on the lap joint.

Optionally, a limiting protrusion is provided by protruding from the top of the base, and the bottom of the outer container body is concave to form a limiting groove that cooperates with the limiting protrusion.

Optionally, the split ultrasonic cleaning machine further includes a cover body, and the cover body covers the cleaning groove.

Optionally, the top of the cover body is provided with at least one movable through hole for a to-be-cleaned article to pass through, and the movable through hole is communicated with the cleaning groove.

Optionally, a slidable baffle is provided in the movable through hole.

Optionally, the cover body further includes a flexible member for closing the movable through hole, and the flexible member is provided with an openable movable gap.

Optionally, the ultrasonic cleaning machine further includes a sterilization module electrically connected to the main control module, and the sterilization module is provided at a bottom of the cover body or on an inner wall of the cylinder body.

Optionally, the base is provided with a mounting groove, and the cylinder body is detachably mounted in the mounting groove.

Optionally, the mounting groove is arranged on the top of the base.

Optionally, an inner wall of the mounting groove is provided with a guide groove, and a guide protrusion cooperating with the guide groove is provided by protruding from an outer wall of the cylinder body.

Optionally, the ultrasonic cleaning machine further includes a heat dissipation mechanism, heat dissipation holes are formed in the bottom of the base, and the heat dissipation mechanism is arranged in the base and faces the heat dissipation holes.

According to the split ultrasonic cleaning machine of the present invention, the main control module is arranged in the base, the mounting groove is formed at the top of the base, and the cylinder body is detachably mounted in the mounting groove, so that the modular design of integral assembly is achieved. The cylinder body is fixed in the mounting groove when in use and is electrically connected to the main control module to achieve functional control. When cleaning or maintenance is required, the cylinder body may be quickly disassembled from the mounting groove. The design of the cylinder body being detachably mounted in the mounting groove makes the cleaning of the cleaning groove more convenient without moving the device as a whole, thus preventing the cleaning liquid from entering the base and causing damage to electrical components such as the main control module, and further effectively improving the practicality of the split ultrasonic cleaning machine.

BRIEF DESCRIPTION OF DRAWINGS

To more clearly illustrate the technical solutions in the embodiments of the present invention or in the prior art, the drawings required to be used in the description of the embodiments or the prior art are briefly introduced below. It is obvious that the drawings in the description below are only some embodiments of the present invention, and those of ordinary skill in the art can obtain other drawings according to structures illustrated in these drawings without creative efforts.

DESCRIPTIONS OF REFERENCE NUMERALS

Figure 1:
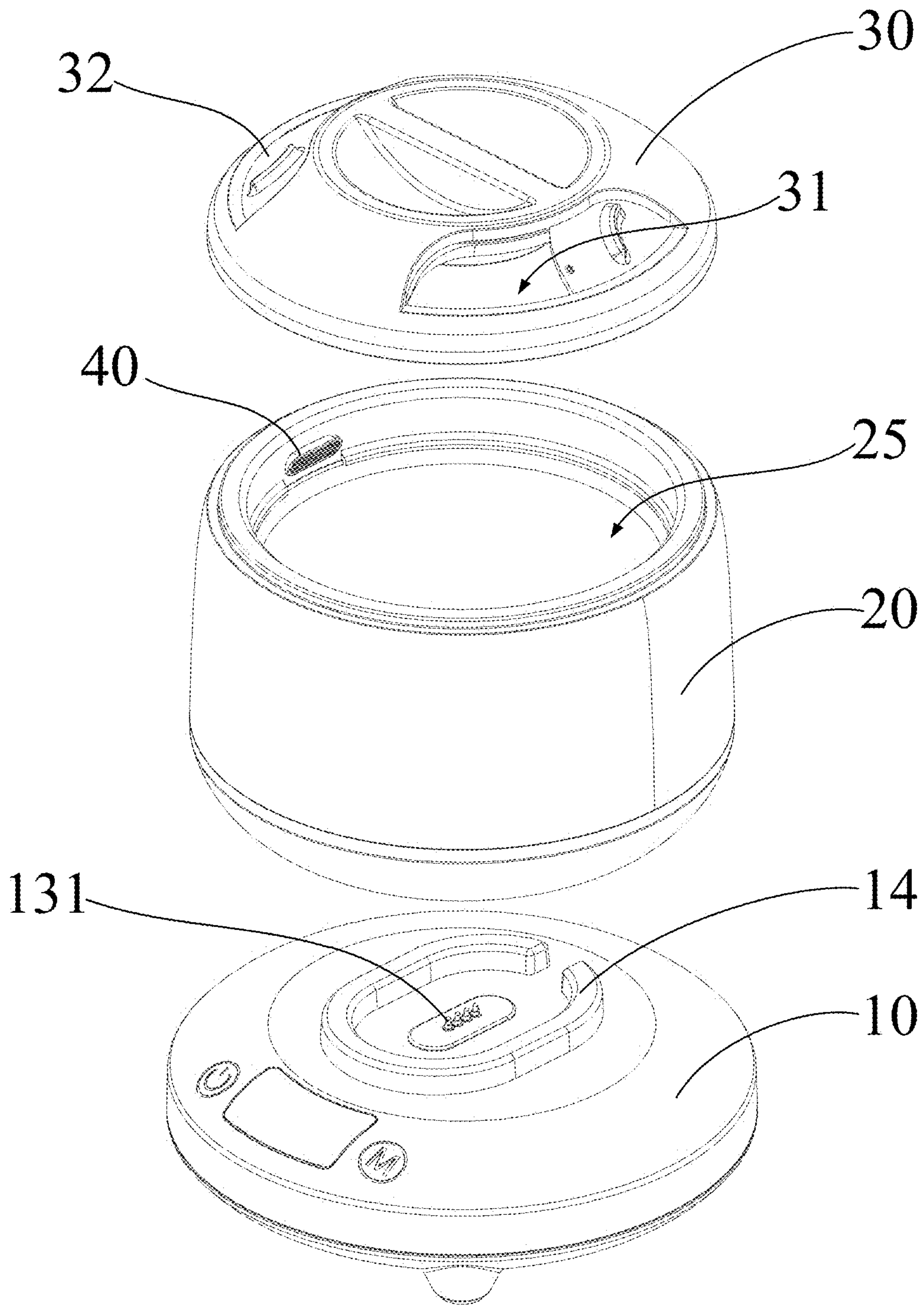
FIG. 1 is a schematic diagram of an exploded state of an embodiment of a split ultrasonic cleaning machine according to the present invention.

10: base; 11: upper shell; 111: first mounting cavity; 12: lower shell; 13: main control module; 131: power supply terminal; 14: limiting protrusion; 15: mounting groove; 151: guide groove; 16: heat dissipation hole; 20: cylinder body; 21: outer container body; 212: second mounting cavity; 213: first shell; 214: second shell; 22: fixed frame; 23: limiting groove; 24: inner container body; 241: lap joint; 25: cleaning groove; 26: ultrasonic cleaning module; 261: piezoelectric ceramic disk; 262: electric terminal; 27: sealing ring; 28: guide protrusion; 30: cover body; 31: movable through hole; 32: baffle; 33: flexible member; 34: movable gap; 40: sterilization module; and 50: heat dissipation mechanism.

DETAILED DESCRIPTION OF EMBODIMENTS

The technical solutions in the embodiments of the present invention will be clearly and completely described below with reference to the drawings in the embodiments of the present invention. It is apparent that the described embodiments are only some, but not all, embodiments of the present invention. Based on the embodiments of the present invention, all other embodiments obtained by those of ordinary skill in the art without creative efforts fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

The present invention proposes a split ultrasonic cleaning machine.

In an embodiment of the present invention, as shown in FIGS. 1 to 6, the split ultrasonic cleaning machine includes: a base 10, wherein the base 10 is provided with a main control module 13; and a cylinder body 20, wherein the cylinder body 20 is detachably mounted on the base 10, a cleaning groove 25 is provided in the cylinder body 20, an ultrasonic cleaning module 26 is provided at a bottom of the cylinder body 20, and the ultrasonic cleaning module 26 is electrically connected to the main control module 13.

In this embodiment, the base 10 is the main body of the device, and the main control module 13 is arranged inside the base. The main control module 13 is used to receive an external power supply and control various functions of the device, including the start and stop of the ultrasonic cleaning module 26.

The cylinder body 20 is an important component of the split ultrasonic cleaning machine and has a main function of containing a cleaning liquid and a to-be-cleaned article. A cleaning groove 25 is provided in the cylinder body 20 for containing cleaning solution and for containing a to-be-cleaned article. The ultrasonic cleaning module 26 is mounted to a bottom of the cylinder body 20. This module is generally composed of a piezoelectric ceramic disk 261, and can effectively remove dirt on the surface of an article by oscillating the cleaning liquid strongly by ultrasonic vibration. The ultrasonic cleaning module 26 is electrically connected to the main control module 13, so that the cleaning module can be precisely controlled.

The cylinder body 20 and the base 10 are detachably connected, so that a user can easily detach the cylinder body 20 from the base 10 when cleaning or maintenance is required. The connection between the cylinder body 20 and the base 10 ensures that the cleaning liquid in the cleaning groove 25 does not leak into the base 10, and protects the main control module 13 and other electrical components from being damaged.

The split ultrasonic cleaning machine achieves the modular design of integral assembly by providing the main control module 13 in the base 10, arranging the mounting groove 15 on the top of the base 10, and detachably mounting the cylinder body 20 in the mounting groove 15. The cylinder body 20 is fixed in the mounting groove 15 when in use and is electrically connected to the main control module 13 to achieve functional control. When cleaning or maintenance is required, the cylinder body 20 may be quickly disassembled from the mounting groove 15. The design of the cylinder body 20 being detachably mounted in the mounting groove 15 makes the cleaning of the cleaning groove 25 more convenient without moving the device as a whole, thus preventing the cleaning liquid from entering the base 10 and causing damage to electrical components such as the main control module 13, and further effectively improving the practicality of the split ultrasonic cleaning machine.

Figure 2:
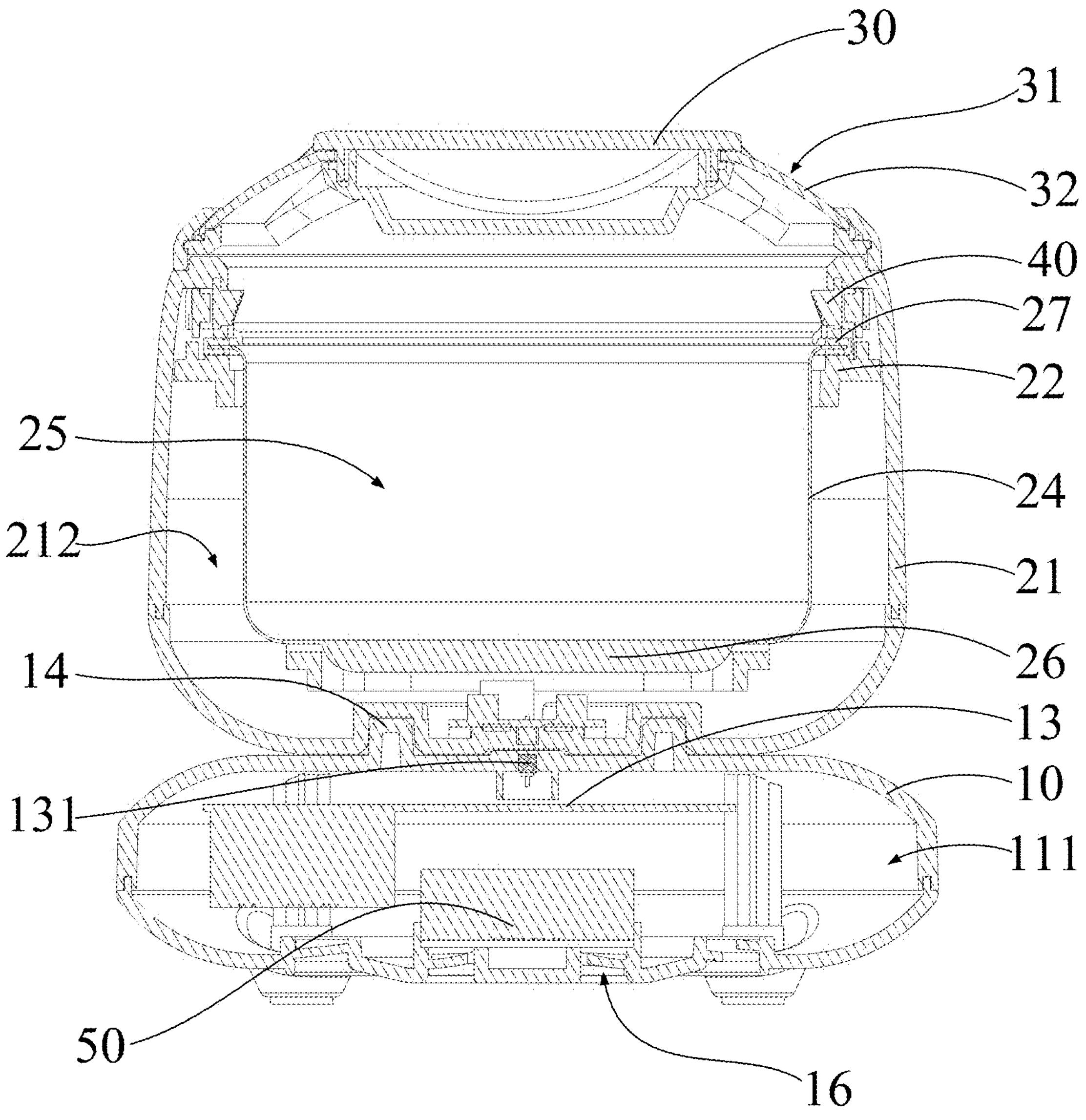
FIG. 2 is a schematic diagram of a cross-sectional structure of an embodiment of a split ultrasonic cleaning machine according to the present invention.
Figure 3:
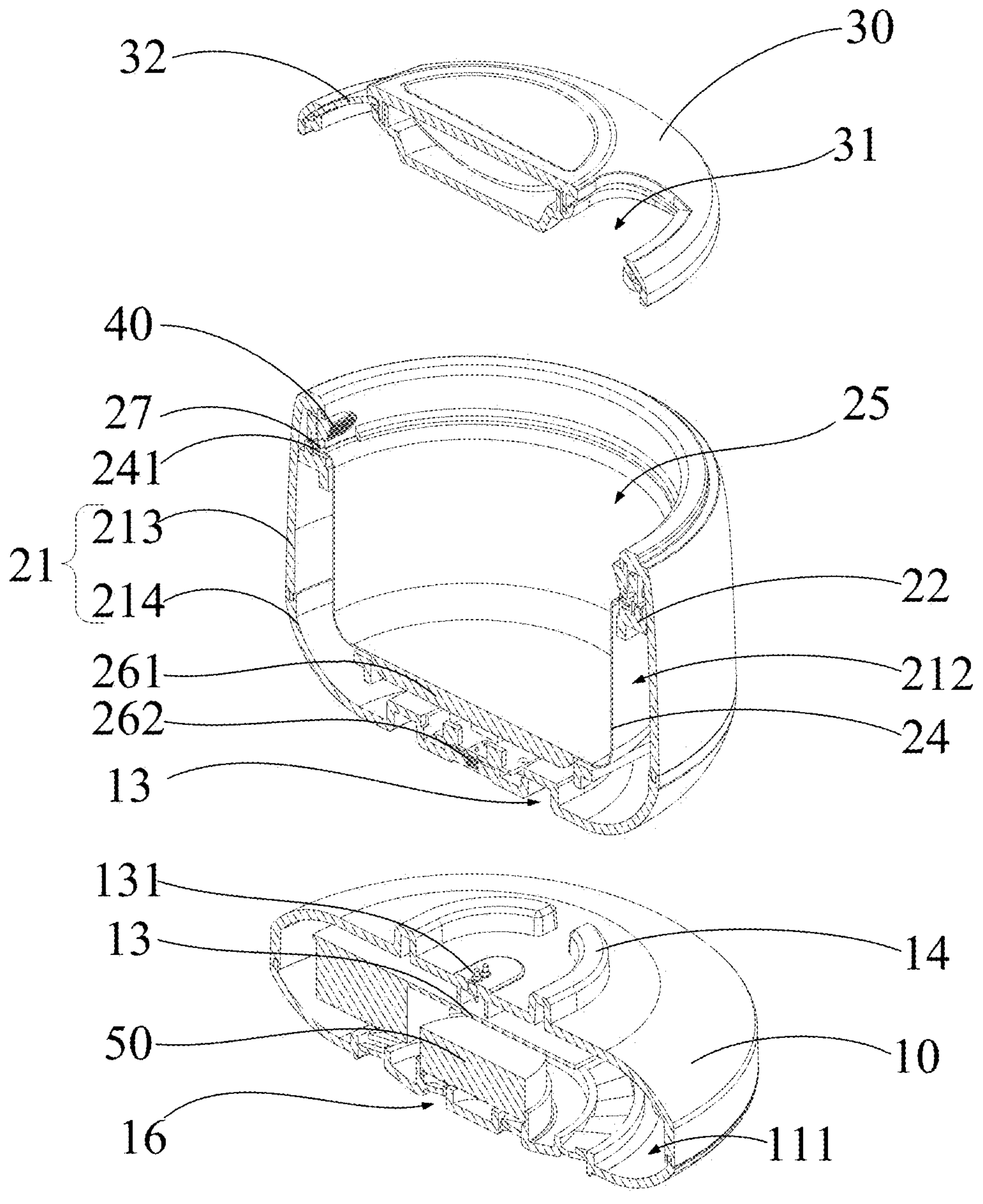
FIG. 3 is a cross-sectional schematic diagram of an exploded state of an embodiment of a split ultrasonic cleaning machine according to the present invention.
Figure 4:
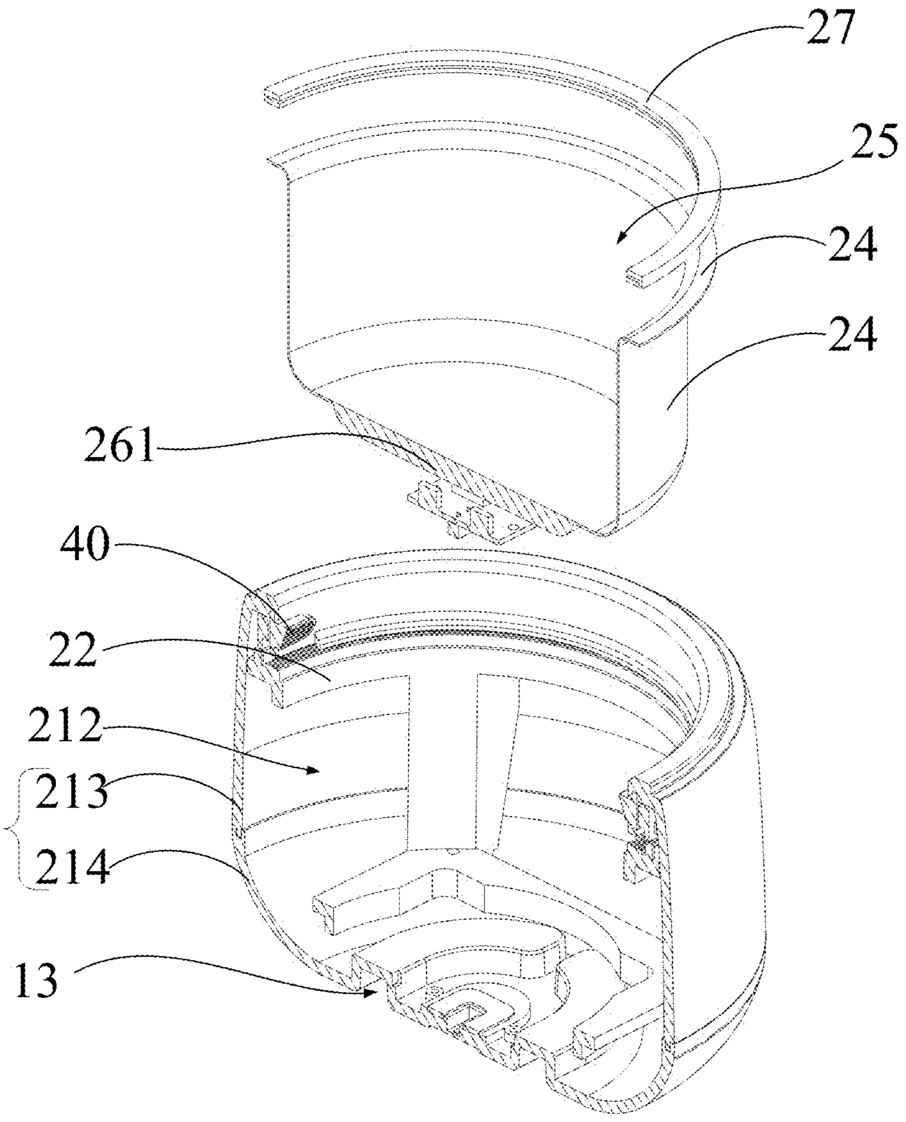
FIG. 4 is a cross-sectional schematic diagram of an exploded state of an embodiment of a cylinder body.

Further, as shown in FIGS. 1 to 3, the base 10 includes an upper shell 11 and a lower shell 12 buckled with the upper shell 11, the upper shell 11 and the lower shell 12 are enclosed to form a first mounting cavity 111, and the main control module 13 is provided in the first mounting cavity 111. In this embodiment, the upper shell 11 and the lower shell 12 enclose a first mounting cavity 111. The main control module 13 is provided in the first mounting cavity 111, which can effectively prevent the cleaning liquid from entering the base 10 and causing damage to the main control module 13 and other electrical components, thereby effectively improving the practicality of the split ultrasonic cleaning machine.

Further, as shown in FIGS. 1 to 6, the main control module 13 is provided with a power supply terminal 131, the ultrasonic cleaning module 26 is provided with an electric terminal 262, the upper shell 11 is provided with a first mounting hole, and the power supply terminal 131 passes through the first mounting hole and is electrically connected to the electric terminal 262. In this embodiment, the main control module 13 has a power supply terminal 131, and the ultrasonic cleaning module 26 has an electric terminal 262 matched therewith. To achieve the electrical connection between the main control module 13 and the ultrasonic cleaning module 26, a first mounting hole is formed on the upper shell 11, and the power supply terminal 131 passes through the first mounting hole and is electrically connected to the electric terminal 262. The connection between the power supply terminal 131 and the electric terminal 262 ensures that the main control module 13 supplies the required power to the ultrasonic cleaning module 26 to drive the ultrasonic cleaning module 26 to operate. Specifically, the power supply terminal 131 transmits the power generated by the main control module 13 to the electric terminal 262 of the ultrasonic cleaning module 26, so that the ultrasonic cleaning module 26 can operate normally and perform ultrasonic cleaning. This design ensures the stability and safety of power transmission, and avoids problems such as poor contact and line damage that may occur in traditional cable connections. In addition, the design of the mounting hole facilitates production and maintenance, simplifies the assembly process of the split ultrasonic cleaning machine, and reduces the risk of device failure, thereby improving the service life and reliability of the split ultrasonic cleaning machine.

Further, as shown in FIGS. 1 to 5, the cylinder body 20 includes an outer container body 21 and an inner container body 24, the outer container body 21 has a second mounting cavity 212 with an opening at one side, the inner container body 24 is provided in the second mounting cavity 212 and closes the opening of the second mounting cavity 212, the cleaning groove 25 is formed at a top of the inner container body 24, and the ultrasonic cleaning module 26 is provided in the second mounting cavity 212; and a second mounting hole is formed in a bottom of the outer container body 21, and the electric terminal 262 passes through the second mounting hole and is electrically connected to the power supply terminal 131. In this embodiment, the cylinder body 20 includes an inner container body 24 and an outer container body 21. The outer container body 21 has a second mounting cavity 212 with an opening at one side, the inner container body 24 is provided in the second mounting cavity 212 and closes the opening, and the top of the inner container body 24 is provided with a cleaning groove 25 for loading a to-be-cleaned article. The ultrasonic cleaning module 26 is arranged in the second mounting cavity 212 and positioned outside the inner container body 24. It may be understood that the ultrasonic cleaning module 26 is arranged in a space between the outer container body 21 and the inner container body 24, thereby effectively preventing the ultrasonic cleaning module 26 from being damaged by external force.

To ensure smooth power connection, a second mounting hole is formed at the bottom of the outer container body 21, and the electric terminal 262 passes through the second mounting hole and is electrically connected to the power supply terminal 131. The electrical connection between the electric terminal 262 and the power supply terminal 131 ensures that the ultrasonic cleaning module 26 can obtain the power supplied by the main control module 13 and start and work normally. The arrangement of the second mounting hole can simplify the mounting of an electrical connection component and provide a stable and reliable electrical connection method, avoiding the line aging and damage in traditional cable connections.

Further, as shown in FIGS. 1 to 5, the ultrasonic cleaning module 26 includes an electric terminal 262 and a piezoelectric ceramic disk 261 electrically connected to the electric terminal 262, and the piezoelectric ceramic disk 261 is provided at a bottom of the inner container body 24. In this embodiment, the electric terminal 262 is used to electrically connect to the power supply terminal 131 of the main control module 13, and provide necessary working power for the piezoelectric ceramic disk 261 through a power supply. The piezoelectric ceramic disk 261 is welded on the bottom of the inner container body 24 to ensure that the vibration generated by the ultrasonic cleaning module 26 can act on a to-be-cleaned article to the maximum extent, thereby improving the cleaning quality.

It should be explained that the ultrasonic piezoelectric ceramic disk is a functional ceramic material based on piezoelectric effect, and can convert mechanical energy and electric energy into each other. The main working principles of the piezoelectric ceramic include direct piezoelectric effect and inverse piezoelectric effect:

Direct piezoelectric effect: applying pressure to a piezoelectric surface can generate an electrical charge, thereby converting mechanical energy into electrical energy.

Inverse piezoelectric effect: applying an alternating electric field to the piezoelectric ceramic disk can change the shape of the piezoelectric ceramic, thereby converting electrical energy into mechanical energy.

This embodiment uses inverse piezoelectric effect, which converts electrical energy into mechanical energy, so that the piezoelectric ceramic disk generates ultrasonic waves to drive the cleaning liquid to oscillate rapidly, thereby cleaning a to-be-cleaned article.

Further, as shown in FIGS. 1 to 4, the outer container body 21 includes a first shell 213 and a second shell 214 buckled with the first shell 213, a fixed frame 22 is provided in the second shell 214, a lap joint 241 is provided by protruding outwards from the top of the inner container body 24, the lap joint 241 is lapped on a top of the fixed frame 22, and the first shell 213 extrudes the lap joint 241. In this embodiment, the buckling between the first shell 213 and the second shell 214 ensures the stability of the outer container body 21, and is convenient for mounting and disassembly. The outer container body 21 serves to protect the internal components of the ultrasonic cleaning machine from external physical damage and contamination.

The fixed frame 22 is arranged in the second shell 214. The fixed frame 22 is used to support and fix the inner container body 24 of the cleaning machine, so as to ensure that the inner container body 24 keeps a stable position in the operation process and avoid displacement caused by vibration or improper operation.

The top of the inner container body 24 is designed with a lap joint 241 protruding outward. The lap joint 241 is used to lap on the top of the fixed frame 22 in the outer container body 21. With this lap joint structure, the top of the container body 24 can be stably connected to the fixed frame 22, thereby increasing the stability of the container body 24. An extrusion method is adopted between the first shell 213 of the outer container body 21 and the lap joint 241 of the inner container body 24. Specifically, when the first shell 213 is buckled, a certain extrusion force is applied to the lap joint 241, so that the lap joint 241 is tightly fitted with the top of the fixed frame 22. This arrangement provides a secure connection between the container body 24 and the fixed frame 22, and avoids any instability or loosening of the inner container body 24 during the cleaning process.

Further, the cylinder body 20 further includes a sealing ring 27, and the sealing ring 27 is sleeved on the lap joint 241, so as to effectively improve the sealing performance between the inner container body 24 and the outer container body 21 and prevent the liquid from corroding the ultrasonic cleaning module 26 in the first mounting space.

Further, as shown in FIGS. 1 to 4, a limiting protrusion 14 is provided by protruding from the top of the base 10, and the bottom of the outer container body 21 is concave to form a limiting groove 23 that cooperates with the limiting protrusion 14. In this embodiment, the top of the base 10 is provided with a limiting protrusion 14, and the bottom of the outer container body 21 is concave to form a limiting groove 23 that cooperates with the limiting protrusion, so that the limiting groove and the limiting protrusion are precisely assembled through the positioning structure. Specifically, the limiting protrusion 14 protrudes from a surface of the base 10, and the size and shape of the limiting protrusion are matched with those of the limiting groove 23, so that when the outer container body 21 is mounted, the limiting groove 23 is accurately sleeved on the limiting protrusion 14, thereby ensuring that a stable connection is formed between the outer container body 21 and the base 10, and preventing any positional displacement during use.

This design enables the outer container body 21 to be firmly fixed when the cleaning machine is working, thereby preventing the outer container body 21 from loosening or shifting due to vibration or external force, and ensuring the operating stability of the cleaning machine. In addition, the cooperation between the limiting protrusion 14 and the limiting groove 23 not only improves the assembling accuracy, but also facilitates the disassembly and mounting of the device, and improves the convenience of use and maintenance, so that the overall use experience is optimized.

Further, as shown in FIGS. 1 to 5, the split ultrasonic cleaning machine further includes a cover body 30, and the cover body 30 covers the cleaning groove 25. In this embodiment, the cover body 30 is used to prevent the cleaning liquid from splashing during the cleaning process, so as to prevent the cleaning liquid from polluting the surrounding environment. In addition, the closed design of the cover body 30 can also improve the cleaning effect, and the efficiency and the precision of ultrasonic cleaning are enhanced through the formation of the closed space. The connection between the cover body 30 and the cleaning groove 25 is simple, which is convenient for the user to open or close, and further improves the convenience of operation of the device.

Further, as shown in FIGS. 1 to 5, the top of the cover body 30 is provided with at least one movable through hole 31 for a to-be-cleaned article to pass through, and the movable through hole 31 is communicated with the cleaning groove 25. In this embodiment, the movable through hole 31 is used for the user to directly place a to-be-cleaned article into the cleaning groove 25 through the hole without affecting the sealing performance of the cleaning groove 25 and the cleaning process, thereby effectively improving the practicability of the ultrasonic cleaning machine.

Further, as shown in FIGS. 1 to 3, a slidable baffle 32 is provided in the movable through hole 31. In this embodiment, the baffle 32 is used for the user to open or close the movable through hole 31, so that the user can conveniently adjust the size of the through hole based on a cleaning requirement. When it is necessary to put to-be-cleaned articles through the through hole, the baffle 32 can slide to a corresponding position to keep the through hole open. After the cleaning operation is completed, the baffle 32 slides to a closed position to prevent the cleaning liquid from leaking out and ensure a clean cleaning environment.

Figure 5:
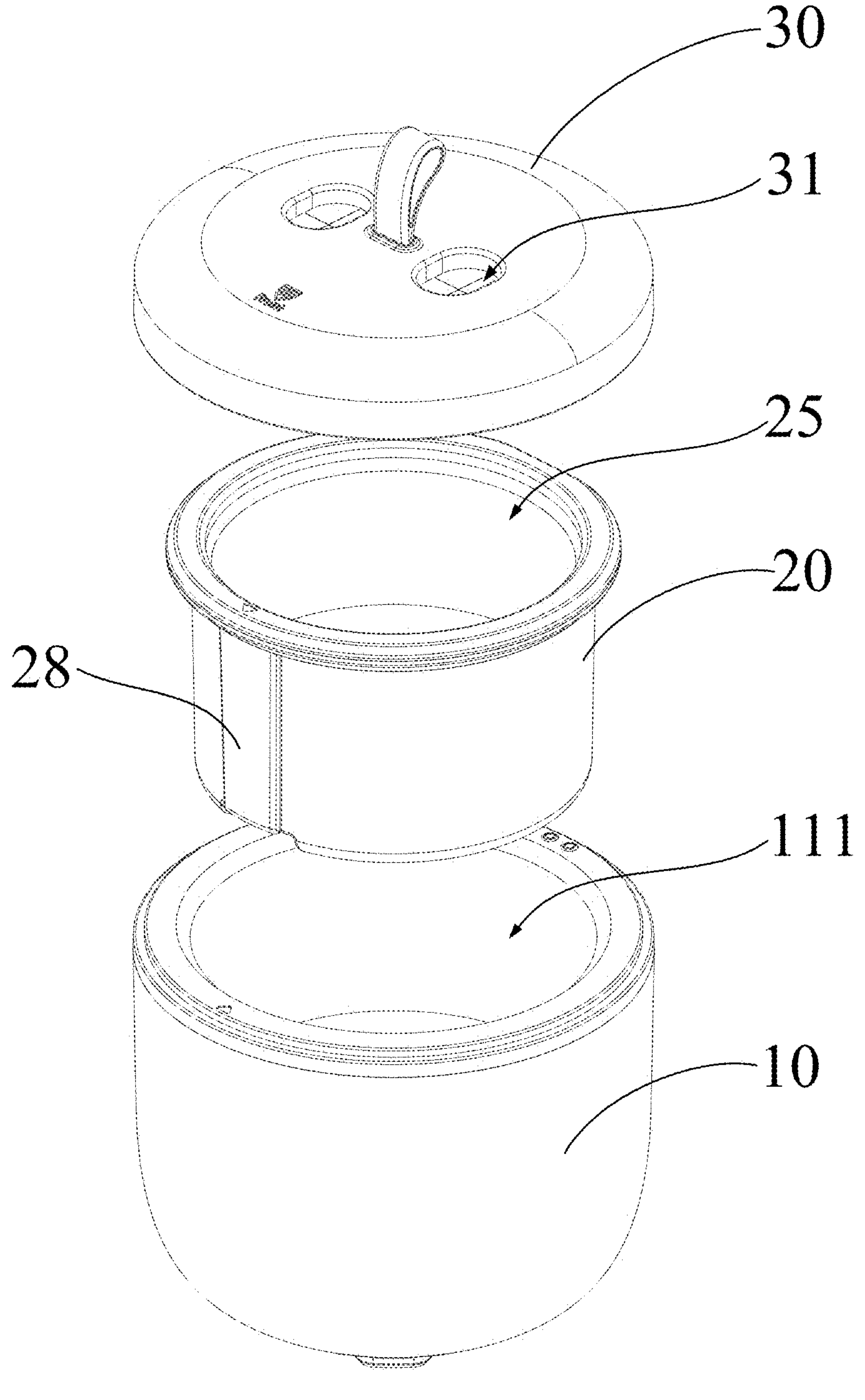
FIG. 5 is a schematic diagram of an exploded state of another embodiment of a split ultrasonic cleaning machine according to the present invention.

Further, as shown in FIG. 5, the cover body 30 further includes a flexible member 33 for closing the movable through hole 31, and the flexible member 33 is provided with an openable movable gap 34. In this embodiment, the flexible member 33 is used to ensure that the movable through hole 31 can be effectively closed during the cleaning process, thereby preventing the cleaning liquid or gas from leaking and maintaining a closed environment inside the cleaning groove 25. This design not only ensures the sealing performance of the device, but also prevents possible impurities or contaminants from entering the ultrasonic cleaning groove 25 during the cleaning process, thereby ensuring the cleaning effect.

The design of the movable gap 34 enables the user to open or close the flexible member 33 based on a requirement, thereby flexibly controlling the use of the movable through hole 31. When the to-be-cleaned article is placed into the cleaning groove 25, the user only needs to insert the to-be-cleaned article into the movable gap 34 and then put the to-be-cleaned article into the movable through hole 31. During the cleaning process, the movable gap 34 is automatically closed to ensure the safety of the cleaning liquid and prevent the cleaning liquid from leaking.

Further, as shown in FIGS. 1 to 5, the ultrasonic cleaning machine further includes a sterilization module 40 electrically connected to the main control module 13, and the sterilization module 40 is provided at a bottom of the cover body 30 or the sterilization module 40 is provided on an inner wall of the cylinder body 20. In this embodiment, the sterilization module 40 is used to sterilize the cleaning liquid or the to-be-cleaned article in the cleaning groove 25, and the position of the sterilization module 40 can be selected based on a design requirement. When being arranged at the bottom of the cover body 30, after the cover body 30 is closed, the sterilization module 40 can sterilize the cleaning groove 25 in an all-round way before the cleaning groove is closed, which prevents the growth of microorganisms such as bacteria and mold, and maintains the cleanliness of the cleaning environment. When being arranged on the inner wall of the cylinder body 20, the sterilization module 40 can directly act on the cleaning liquid, and continuously keep the cleaning liquid clean by using vibration and sterilization technology, which ensures that the articles in each cleaning process are thoroughly disinfected, and effectively improves the cleaning capability of the ultrasonic cleaning machine.

Figure 6:
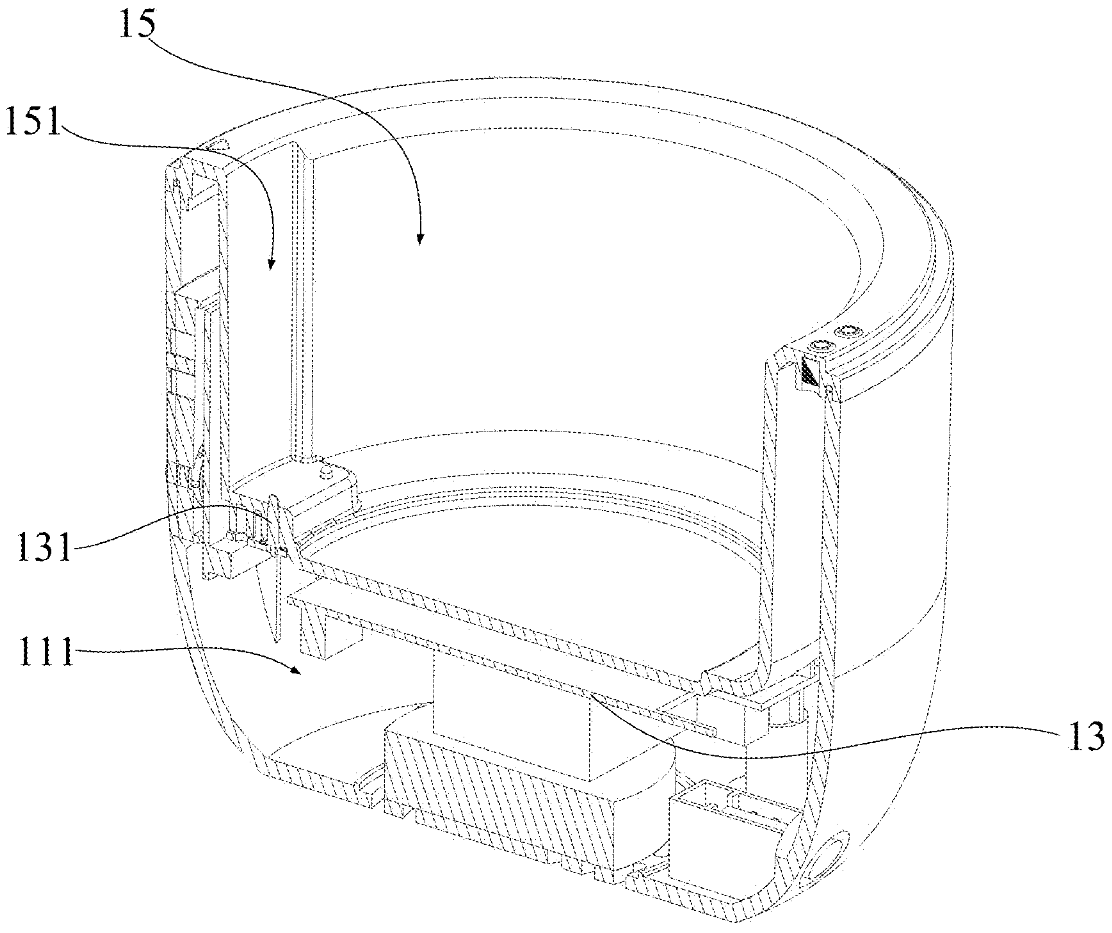
FIG. 6 is a cross-sectional schematic diagram of another embodiment of a base.

Further, as shown in FIGS. 5 and 6, the base 10 is provided with a mounting groove 15, and the cylinder body 20 is detachably mounted in the mounting groove 15. In this embodiment, a mounting groove 15 is provided on the base 10, and the cylinder body 20 can be conveniently positioned and fixed in the groove, thereby ensuring a firm mounting between the cylinder body 20 and the base 10. This design enables more convenient mounting and disassembly of the cylinder body 20 by the user, avoids cumbersome fixing operations, and ensures the stability of the cylinder body 20 during use. The presence of the mounting groove 15 not only simplifies the connection process between the cylinder body 20 and the base 10, but also effectively reduces failures caused by improper mounting or loose connection, thereby improving the durability and safety of the product.

The mounting groove 15 can be positioned on the top or side wall of the base 10 based on a specific structural requirement. For example, when the mounting groove 15 is provided on the top of the base 10, the cylinder body 20 may be inserted into the mounting groove 15 from top to bottom; when the mounting groove 15 is provided on the side wall of the base 10, the cylinder body 20 can be mounted in the mounting groove 15 by sliding horizontally, which is not limited herein.

Further, as shown in FIGS. 5 and 6, the mounting groove 15 is arranged on the top of the base 10. In this embodiment, the mounting groove 15 is preferably formed at the top of the base 10. This design allows the cylinder body 20 to be directly inserted into the mounting groove 15 from the top, and precisely cooperate with the base 10 to be fixed in the mounting groove 15. Meanwhile, the mounting groove 15 with an opening at the top allows the user to mount and disassemble the cylinder body 20 directly from the top without performing complicated alignment operations, thereby simplifying the assembly process. Moreover, the mounting groove 15 at the top of the base 10 can cooperate tightly with the bottom of the cylinder body 20, which ensures that the cylinder body 20 is stable and does not shake during use, thereby ensuring the stability of the cleaning effect. Therefore, the practicability of the split ultrasonic cleaning machine is effectively improved.

Further, as shown in FIGS. 5 and 6, an inner wall of the mounting groove 15 is provided with a guide groove 151, and a guide protrusion 28 cooperating with the guide groove 151 is provided by protruding from an outer wall of the cylinder body 20. In this embodiment, the guide protrusion 28 cooperates with the guide groove 151 on the inner wall of the upper shell 11, so as to effectively guide the correct mounting position of the cylinder body 20 and ensure the stability and precision of the cylinder body 20 during the mounting process. According to this structural design, the cylinder body 20 can smoothly slide into the mounting groove 15 during mounting, and the shifting or asymmetry is avoided, so that the assembly precision and the use reliability of the entire split ultrasonic cleaning machine are improved. In addition, this guide cooperation design can also effectively prevent the cylinder body 20 from loosening or shifting during use, further improving the safety and user experience of the device.

Further, as shown in FIGS. 1 to 3, the ultrasonic cleaning machine further includes a heat dissipation mechanism 50, heat dissipation holes 16 are formed in the bottom of the base 10, and the heat dissipation mechanism 50 is arranged in the base 10 and faces the heat dissipation holes 16. In this embodiment, since the main control module 13 generates a large amount of heat during the operation process, if the heat cannot be discharged out of the base 10 in time, the main control module 13 is easily damaged. Therefore, in this embodiment, the heat dissipation mechanism 50 is provided in the base 10, and the heat is discharged out of the base 10 in time by the heat dissipation hole 16, thereby effectively maintaining the constant temperature in the base 10 and improving the safety of the ultrasonic cleaning machine.

The above mentioned contents are only optional embodiments of the present invention and are not intended to limit the patent scope of the present invention, and under the invention concept of the present invention, the equivalent structural transformations made by using the contents of the specification and the drawings of the present invention, or direct/indirect applications to other related technical fields, are all included in the patent protection scope of the present invention.

What is claimed is:

1. A split ultrasonic cleaning machine, comprising:

a base, wherein the base is provided with a main control module; and a cylinder body, wherein the cylinder body is detachably mounted on the base, a cleaning groove is provided in the cylinder body, an ultrasonic cleaning module is provided at a bottom of the cylinder body, and the ultrasonic cleaning module is electrically connected to the main control module;

wherein the base comprises an upper shell; the main control module is provided with a power supply terminal, the ultrasonic cleaning module is provided with an electric terminal, the upper shell is provided with a first mounting hole, and the power supply terminal passes through the first mounting hole and is electrically connected to the electric terminal.

2. The split ultrasonic cleaning machine according to claim 1, wherein the base comprises a lower shell buckled with the upper shell, the upper shell and the lower shell are enclosed to form a first mounting cavity, and the main control module is provided in the first mounting cavity.

3. The split ultrasonic cleaning machine according to claim 1, wherein the cylinder body comprises an outer container body and an inner container body, the outer container body has a second mounting cavity with an opening at one side, the inner container body is provided in the second mounting cavity and closes the opening of the second mounting cavity, the cleaning groove is formed at a top of the inner container body, and the ultrasonic cleaning module is provided in the second mounting cavity; and a second mounting hole is formed in a bottom of the outer container body, and the electric terminal passes through the second mounting hole and is electrically connected to the power supply terminal.

4. The split ultrasonic cleaning machine according to claim 3, wherein the ultrasonic cleaning module comprises an electric terminal and a piezoelectric ceramic disk electrically connected to the electric terminal, and the piezoelectric ceramic disk is provided at a bottom of the inner container body.

5. The split ultrasonic cleaning machine according to claim 4, wherein the outer container body comprises a first shell and a second shell buckled with the first shell, a fixed frame is provided in the second shell, a lap joint is provided by protruding outwards from the top of the inner container body, the lap joint is lapped on a top of the fixed frame, and the first shell extrudes the lap joint.

6. The split ultrasonic cleaning machine according to claim 5, wherein the cylinder body further comprises a sealing ring, and the sealing ring is sleeved on the lap joint.

7. The split ultrasonic cleaning machine according to claim 3, wherein a limiting protrusion is provided by protruding from the top of the base, and the bottom of the outer container body is concave to form a limiting groove that cooperates with the limiting protrusion.

8. The split ultrasonic cleaning machine according to claim 1, wherein the split ultrasonic cleaning machine further comprises a cover body, and the cover body covers the cleaning groove.

9. The split ultrasonic cleaning machine according to claim 8, wherein a top of the cover body is provided with at least one movable through hole for a to-be-cleaned article to pass through, and the movable through hole is communicated with the cleaning groove.

10. The split ultrasonic cleaning machine according to claim 9, wherein a slidable baffle is provided in the movable through hole.

11. The split ultrasonic cleaning machine according to claim 9, wherein the cover body further comprises a flexible member for closing the movable through hole, and the flexible member is provided with an openable movable gap.

12. The split ultrasonic cleaning machine according to claim 8, wherein the ultrasonic cleaning machine further comprises a sterilizer electrically connected to the main control module, and the sterilizer is provided at a bottom of the cover body or on an inner wall of the cylinder body.

13. The split ultrasonic cleaning machine according to claim 1, wherein the base is provided with a mounting groove, and the cylinder body is detachably mounted in the mounting groove.

14. The split ultrasonic cleaning machine according to claim 13, wherein the mounting groove is arranged on the top of the base.

15. The split ultrasonic cleaning machine according to claim 14, wherein an inner wall of the mounting groove is provided with a guide groove, and a guide protrusion cooperating with the guide groove is provided by protruding from an outer wall of the cylinder body.

* * * * *